Figure 1:
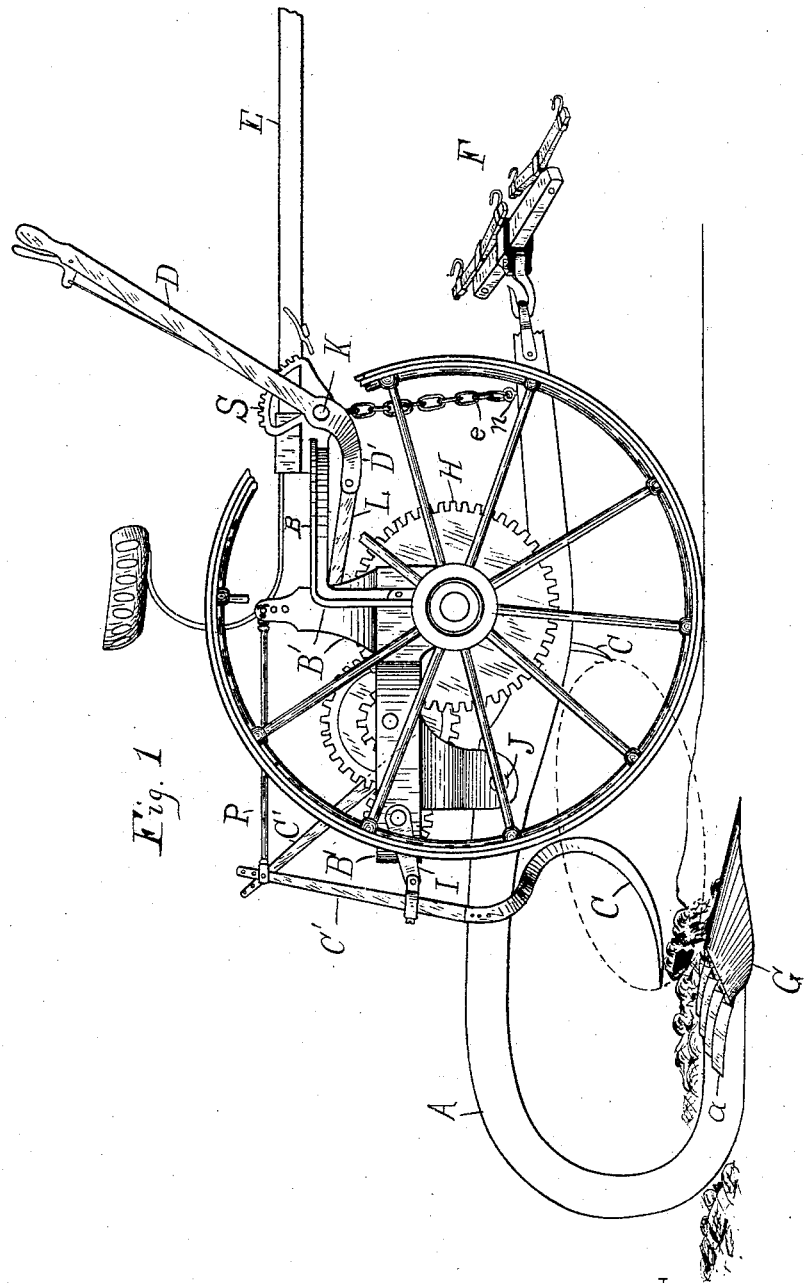

(No Model.) 4 Sheets—Sheet 1.

C. BABCOCK.
POTATO DIGGER.

No. 338,133. Patented Mar. 16, 1886.

WITNESSES
Geo. A. Darby.
John T. Booth

INVENTOR
Charles Babcock
by Geo. A. Mosher
atty.

(No Model.) 4 Sheets—Sheet 3.
C. BABCOCK.
POTATO DIGGER.

No. 338,133. Patented Mar. 16, 1886.

WITNESSES
Geo. A. Darby.
John T. Booth

INVENTOR
Charles Babcock
by Geo. A. ____
Atty (No Model.) 4 Sheets—Sheet 4.
C. BABCOCK.
POTATO DIGGER.
No. 338,133. Patented Mar. 16, 1886.
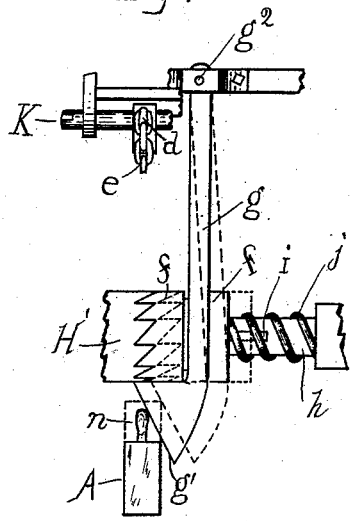
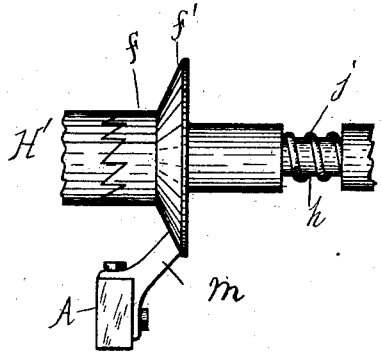
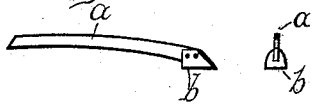
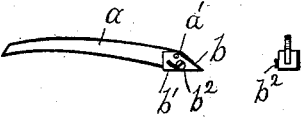
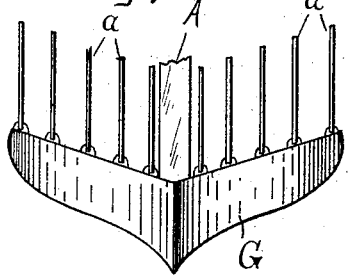
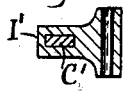
WITNESSES:
Geo. A. Darby
John F. Booth
INVENTOR
Charles Babcock
BY
Geo. A. Mosher
ATTORNEY

UNITED STATES PATENT OFFICE.

CHARLES BABCOCK, OF TROY, NEW YORK, ASSIGNOR OF ONE-FOURTH TO JOHN M. FOSTER, OF SAME PLACE.

POTATO-DIGGER.

SPECIFICATION forming part of Letters Patent No. 338,133, dated March 16, 1886.

Application filed September 28, 1885. Serial No. 178,420. (No model.)

*To all whom it may concern:*

Be it known that I, CHARLES BABCOCK, a resident of the city of Troy, in the county of Rensselaer and State of New York, have invented certain new and useful Improvements in Potato-Diggers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in potato-diggers, and more particularly that class of diggers having a sulky-plow and auxiliary forks operated by gear mechanism.

The objects of my invention are, first, to provide elliptically-traveling and vertically-adjustable forks operating in front of a plow to perform the double office of separating the potatoes from the soil and clearing away obstructions; second, to automatically throw the fork-actuating mechanism out of gear by raising the plow from the ground to a suspended position, convenient for turning around or transportation from one field to another; third, to adjust the penetrating depth of the plow without materially changing the pitch of its point; fourth, to provide separating finger-slats vertically adjustable and laterally flexible.

My invention consists, first, in giving the forks a double curve or sickle shape, and arranging them to travel in front of and toward the plow; also, in attaching them to their supporting-arms in such a manner that they are vertically adjustable thereon relatively to the plow; second, in providing a spring-actuated clutch adapted to slide upon a feather in the driving-axle and engage with gearing to actuate the elliptically-traveling forks, and having a stop to be acted upon by the vertically-adjustable plow-beam, whereby the clutch is forced against its actuating-spring and disengaged from the fork-actuating-gear mechanism when the plow is raised from the ground; third, in pivoting the plow-beam about midway of its length to an arm or frame fulcrumed upon the main axle, and connected with a lever attached to the pole-frame, by which the position of the beam may be adjusted vertically without changing its position horizontally; fourth, in pivoting laterally-flexible separating finger-slats to the rear of the plow for separating the potatoes from the soil and providing them with means of vertical adjustment, as hereinafter more fully described.

Figure 2:
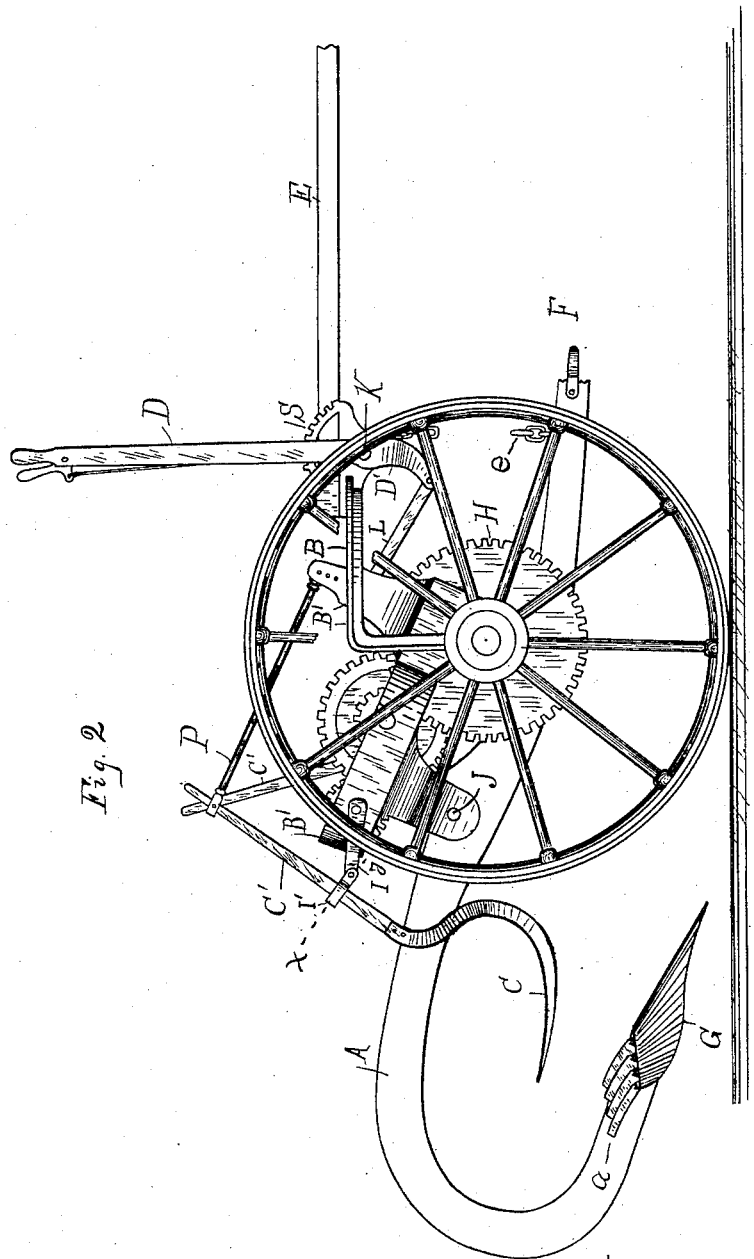
Figure 3:
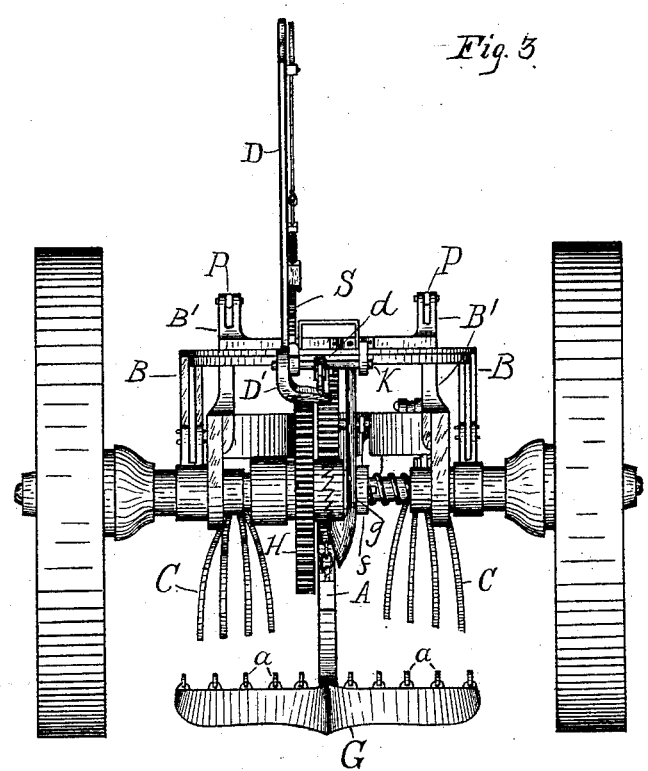

Figure 1 of the drawings is a side elevation of the digger in position for work. Fig. 2 is same with plow suspended above the ground for transportation when not in use. Fig. 3 is a front elevation of same. Fig. 4 is a front elevation of the clutch mechanism and stop for automatically disengaging from the driving-shaft the gearing for actuating the forks. Fig. 5 is a modified form of clutch and actuating-stops. Fig. 6 is a side and end view of one of the separating-slats rigidly attached. Fig. 7 is same, showing slat adjustably attached. Fig. 8 is a side view of one of the forks. Fig. 9 is a plan view of the plow and separating-slats. Fig. 10 is a cross-section at broken line $x\,y$, Fig. 2.

B is the carriage or pole frame which rides upon a two-wheeled axle, $h$, and supports a driver's seat and pole, E, while the tilting frame B', riding upon the same axle, supports plow-beam A, centrally pivoted thereto at J, and a train of gear-wheels connected with and actuating cranks I, one for each fork C. The forks are attached to the lower ends of bars C', which are pivoted at or near the same end to the ends of the cranks I and at or near their upper ends to the rear ends of rods P, the other ends of the rods being pivoted to the tilting frame, as shown in Figs. 1 and 2. When, therefore, the train of gear-wheels is set in motion, the points of the forks revolve and travel in an elliptical orbit about as shown by the dotted lines in Fig. 1.

The plow G, attached to one end of beam A, throws up the soil in which the potatoes are embedded, and the slats $a$, attached to the rear of the plow, form a skeleton platform, causing the soil containing the potatoes to bank up before the forks, which pass through and separate the potatoes from the soil. The horses are attached to the other end of the beam A at F.

The plow can be easily suspended above the ground, in the position shown in Fig. 2, for transportation when not in use or turning around, by means of the lever D, which is fulcrumed at K upon the pole-supporting frame B. The lever is provided with an arm, D', to which is pivoted the link L, connecting the tilting frame B, also with pawl and toothed segment S, for holding the parts in the suspended position. I have also provided means for automatically disengaging the gear-train from its driving mechanism when the plow-beam is suspended, which is shown on a larger scale in Figs. 4 and 5.

The gear-wheel H, loose upon the main wheel-axle $h$, is provided with the toothed hub H', adapted to engage with the toothed clutch $f$, adapted to rotate with the axle and slide thereon upon feather $i$. The actuating-spring $j$ tends to keep the clutch in engagement with hub H' to actuate the gearing. The clutch is provided with a stop, which, as shown in Fig. 4, consists of the arm $g$, pivoted at $g''$ to the main frame and encircling a depression in the clutch, to control the movements of the latter, terminates at its lower end in a beveled or inclined side, $g'$, adapted to be acted upon by the plow-beam A when it is raised to the point of suspension shown in Fig. 2. The beam acting upon the beveled side throws the arm to one side, the latter carrying the clutch with it, until the arm and clutch occupy the position shown by the dotted lines in Fig. 4, in which position the clutch and hub H' are wholly disengaged from each other and the gear-train is not actuated by the rotation of the axle $h$.

When the beam A is let down, the spring $j$ immediately forces the clutch into engagement with the hub H', from which it is evident the gear-train is automatically put in and out of engagement with driving-axle $h$ by suspending and dropping the plow-beam.

A modified form of the automatic device is shown in Fig. 5, in which the rotary clutch, adapted to slide upon the feathered axle, is provided with a beveled annulus, $f'$, and the beam may have a stop, $m$, to come in contact with said annulus, and slide the clutch in and out of engagement with hub H', or the beam itself may act directly upon the annulus. The separating-slats $a$ are preferably made of thin metal secured, at one end to a plow, to project therefrom rearward with the slats set up edgewise. They may be rigidly attached by two rivets to a leaf projecting from the plow, as seen in Fig. 6; or they may be pivoted by pivot $a'$, as shown in Fig. 7, having near one edge a thumb or set screw, $b''$, adapted when loose to slide in the curved slot $b'$ and permit the projecting end of the slat to be raised above or lowered below a horizontal plane and secured by the screw at any desired angle to which it may be moved. Such an adjustment of the slats relatively to a horizontal plane permits of their accommodation to different kinds of soil and to more or less weedy places.

When the potatoes would otherwise be partially covered by the soil or other objects, the projecting ends of the slats can be secured, as above described, in a more elevated position, which permits the soil to drop down through the spaces between the slats and the potatoes to roll off at the rear upon the top of the soil, in plain view.

By having the slats thin and set up edgewise they may be made very flexible and placed near together, which prevents stones and other objects from wedging in between the slats, and permits of a better separation of potatoes and soil.

I give the forks C a double curve, which form I denominate "sickle-shaped." This particular form or shape is very important when the forks are located in front of the plow and moved toward and from the same in an elliptical orbit, as shown.

As the plow is drawn through the soil the latter banks up before the plow, and some kinds—as clayey soil—do not flow steadily over the plow, but clog up and break away at irregular intervals. The forks enter this bank in front of the plow and assist in breaking it up and rendering its distribution steady and even. The shape of the forks is such that they enter the soil by a direct and consequently easy thrust, and leave the soil-bank in a nearly vertical direction, lifting up a portion of the soil and dropping it again when drawn from beneath it by their forward motion on the line of their orbit. (Shown by the dotted line in Fig. 1.) The points of the forks dip by a small angle, by which they more easily enter the soil, and permit of its sliding off when withdrawn from beneath that portion which has been lifted. It will also be seen that the forks do not act in the nature of "kickers" which kick up the soil and potatoes, and throw them broadcast over the ground. The soil is simply lifted and dropped again upon the plow or projecting separator-slats. I am thus able, with very little expenditure of power, to prevent irregular banking and clogging before the plow, and accomplish all that is necessary to the successful operation of the plow and separator-slats in depositing the potatoes upon the surface of the ground, convenient to be picked up and carried away.

By having the plow-beam pivoted about midway of its length, as at J, to the tilting frame B', which is fulcrumed upon axle $h$, and can be tilted by lever D, attached to stationary pole-frame B, and connected by link L to B', I can vertically adjust the depth of the plow by means of the lever.

The level of the plow-beam is maintained by the draft upon the end of the beam at F.

The shanks C' of the forks are provided with a series of pivot-apertures in their upper ends, and are adapted to slide in an attachment or socket, I', which is pivoted to the end of arms I, being secured in the desired position by set-screws S', by which their height may be varied at will.

By employing different apertures in pivoting C' upon P, the shape of the orbit traveled by the fork can be varied.

When the forks are severally provided with a plurality of tines, it frequently happens when a tine upon one side of a fork comes in contact with a stone or other unusual obstacle a very great rotary strain is exerted upon the shank C', and a set-screw, as S', would cut the shank, as I have learned by experiment. I therefore prefer to construct the shank so that the cross-sectional area of that portion which slides in its supporting attachment I' shall be rectangular in form, making the aperture in the attachment of a corresponding form to fit and receive the shank, as shown in Fig. 10. Such a form affords the greatest resistance to a rotary tendency, and the contact-surfaces are not likely to mar each other to interfere with the vertically-sliding adjustment of the forks, as in other forms of construction.

What I claim as new, and desire to secure by Letters Patent, is—

1. In a potato-digger having a potato-digging plow, a sickle-shaped fork, C, provided with means—as driving-axle $h$, connected by a gear-train with operating-crank I, and pivoted arm P—for causing said fork to travel rearwardly through the soil toward and above said plow in an approximately-elliptical orbit, substantially as described, and for the purposes set forth.

2. In a potato-digger, the combination, with a plow, of a series of thin laterally-flexible slats pivoted to the plow and projecting rearwardly therefrom, substantially as described, and for the purposes set forth.

3. In a sulky potato-digger provided with a rotary crank-shaft for actuating a vertically-adjustable reciprocating fork provided with a plurality of tines and rectangular-shaped shank, the combination, with a rectangular-shaped socket pivoted to said shank, with said rectangular-shaped fork-crank adapted to fit and slide in said socket, substantially as described, and for the purposes set forth.

In testimony whereof I have hereunto set my hand this 18th day of September, 1885.

CHARLES BABCOCK.

Witnesses:
GEO. A. MOSHER,
W. H. HOLLISTER, Jr.